Feb. 15, 1927.
G. A. SHIELDS
1,617,653
APPARATUS FOR FORMING GLASS SHEETS OR PLATES
Original Filed June 11, 1925    5 Sheets-Sheet 3

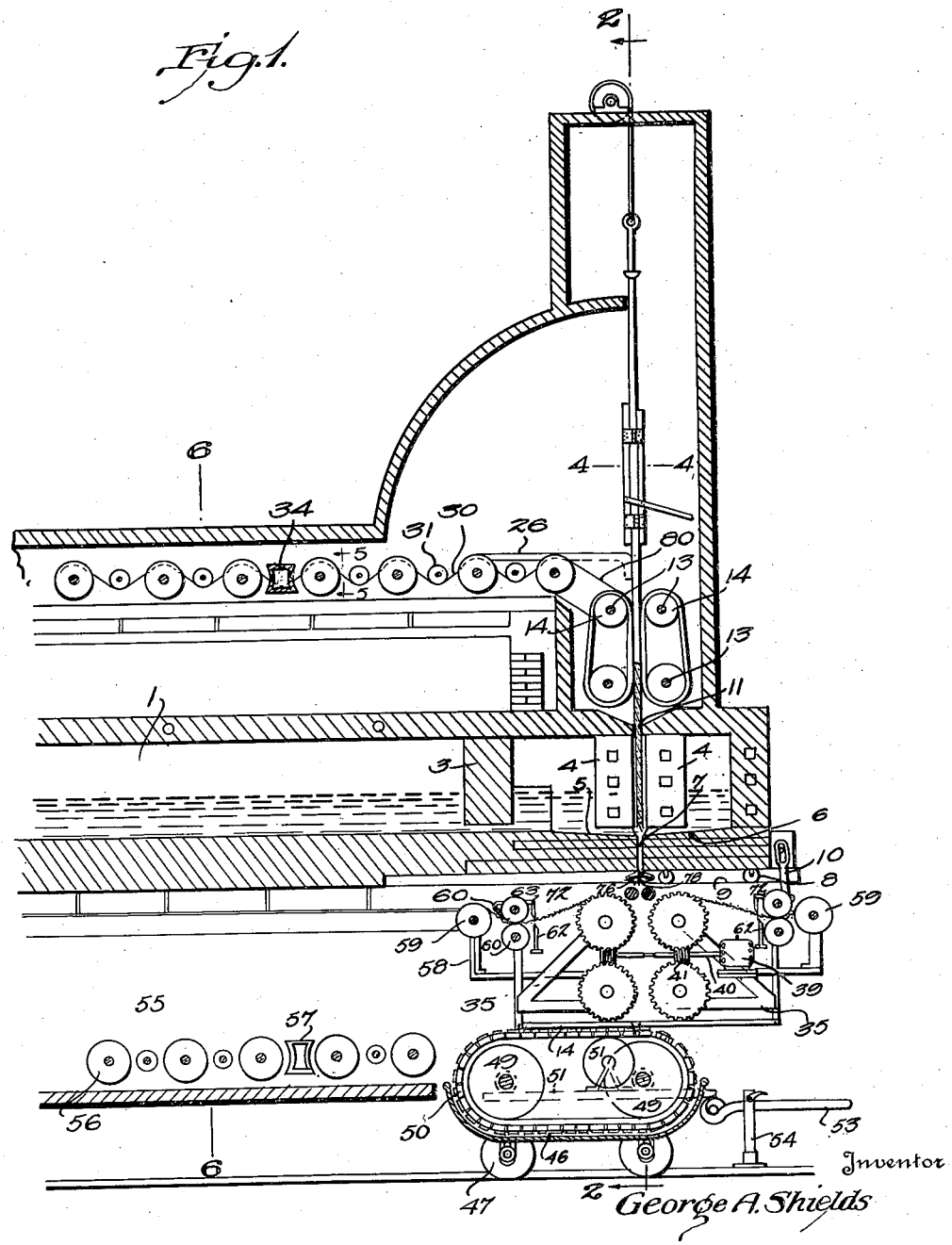

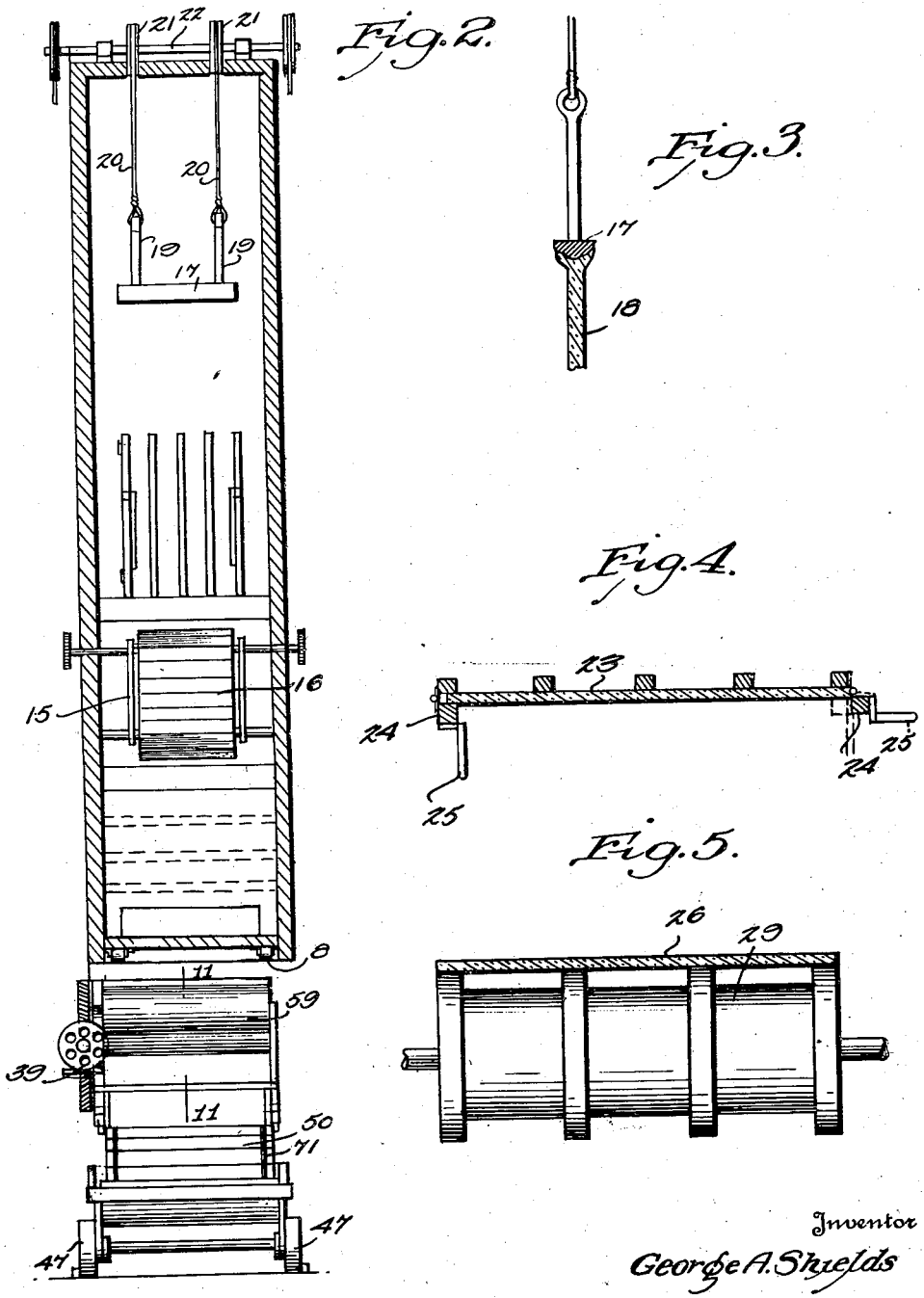

Inventor
George A. Shields

By
Attorney

Feb. 15, 1927. 1,617,653
G. A. SHIELDS
APPARATUS FOR FORMING GLASS SHEETS OR PLATES
Original Filed June 11, 1925   5 Sheets-Sheet 4
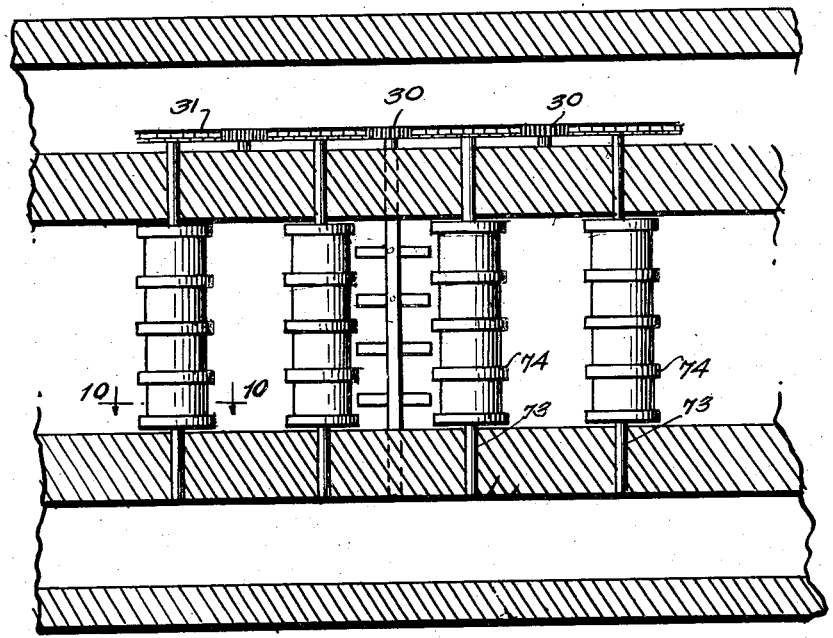
Fig. 8.
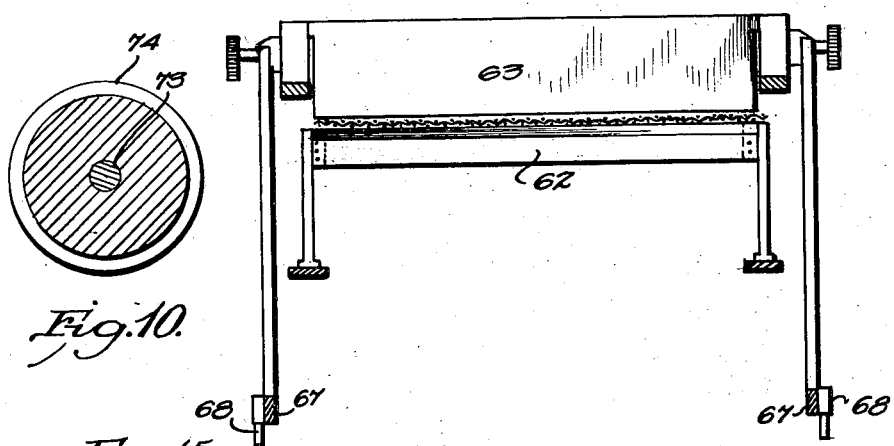
Fig. 9.
Fig. 10.
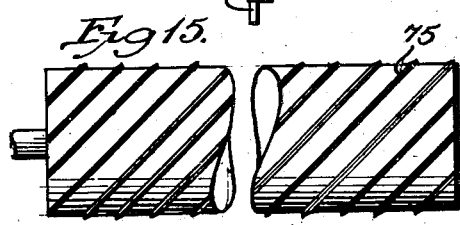
Fig. 15.
Inventor
George A. Shields
By
Attorney Feb. 15, 1927. 1,617,653
G. A. SHIELDS
APPARATUS FOR FORMING GLASS SHEETS OR PLATES
Original Filed June 11, 1925   5 Sheets-Sheet 5
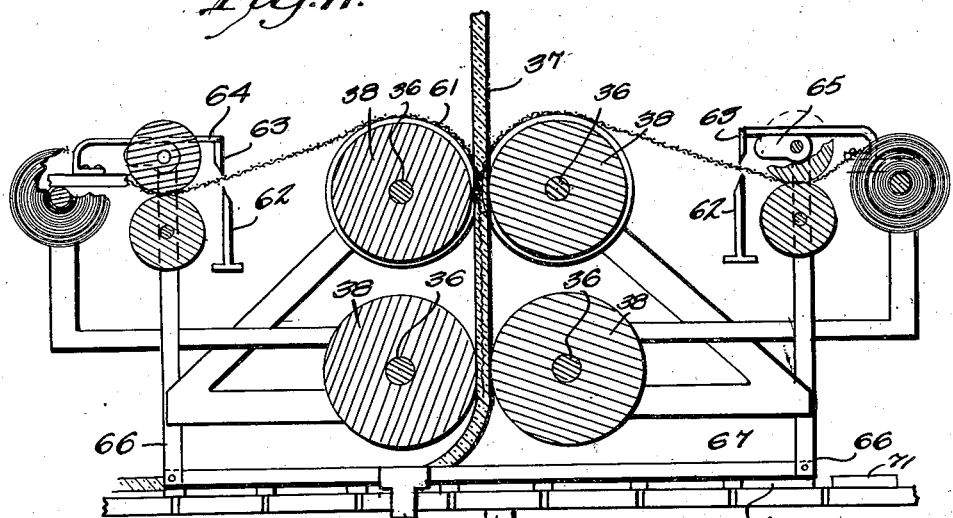
Fig. 11.
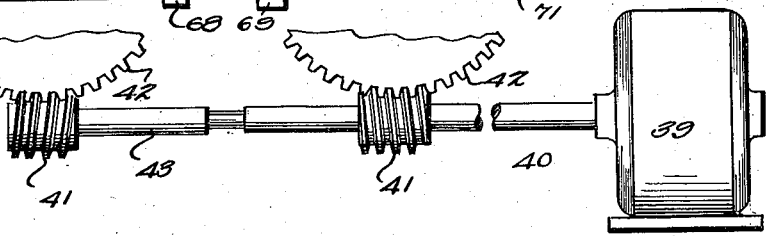
Fig. 12.
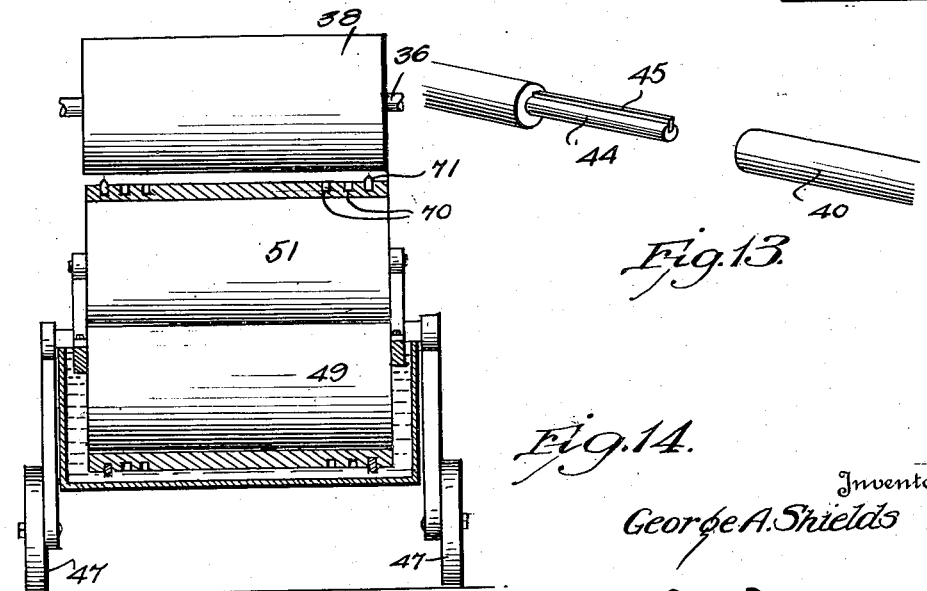
Fig. 13.
Fig. 14.
Inventor
George A. Shields
By
Attorney Patented Feb. 15, 1927.

1,617,653

UNITED STATES PATENT OFFICE.

GEORGE A. SHIELDS, OF COLUMBUS, OHIO.

APPARATUS FOR FORMING GLASS SHEETS OR PLATES.

Application filed June 11, 1925, Serial No. 36,383. Renewed November 15, 1926.

This invention relates to apparatus for forming glass sheets or plates, and is an improvement over the construction shown in my copending application filed February 19, 1923, Serial No. 619,916.

An object of the invention is the provision of means for annealing glass in which the radiated heat from the melting chamber or main tank is employed.

A further object is the provision of means for drawing glass upwardly and means to permit the glass to flow downwardly between rollers by means of which the glass is rolled in its downward movement.

A further object of the invention is the provision of means for embedding wire in the glass, including means for cutting the wire in proper length and means for cutting the glass into sheets of proper width and length.

In the accompanying drawings, I have shown one embodiment of the invention. In this showing:

Figure 1 is a central vertical longitudinal sectional view,

Figure 2 is a vertical sectional view on line 2—2 of Figure 1,

Figure 6:
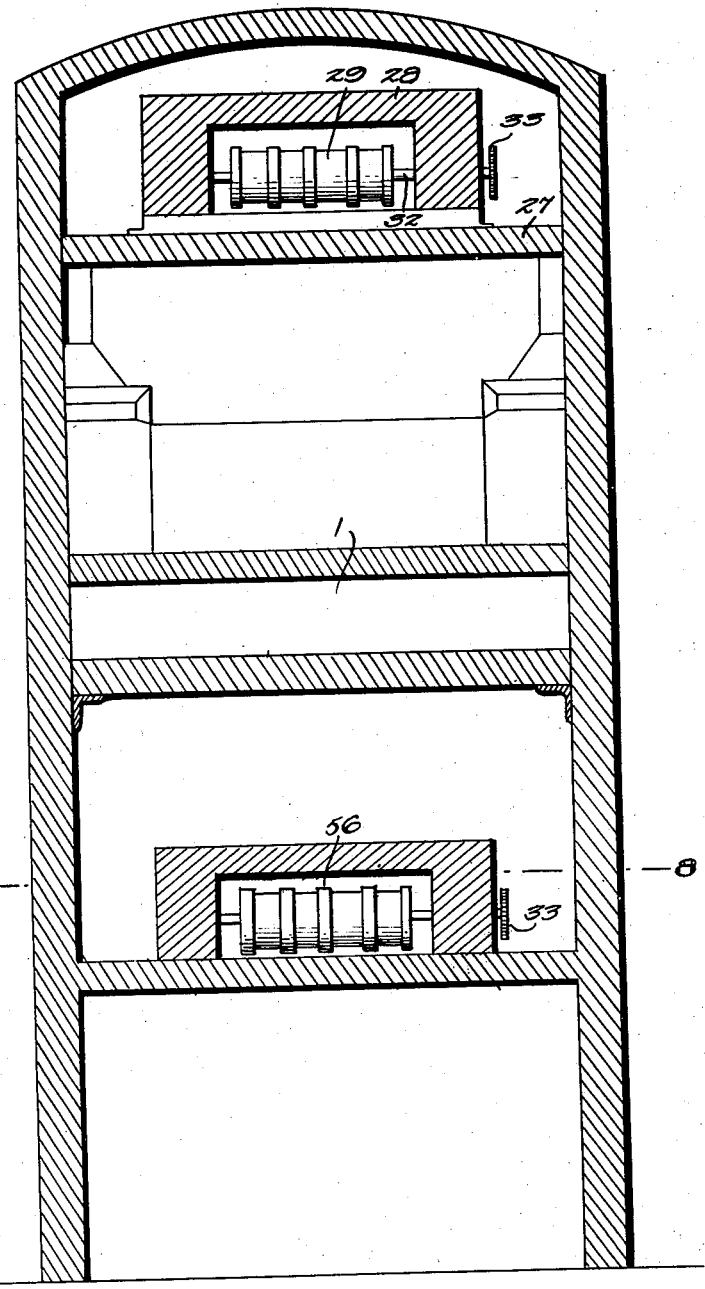
Figure 7:
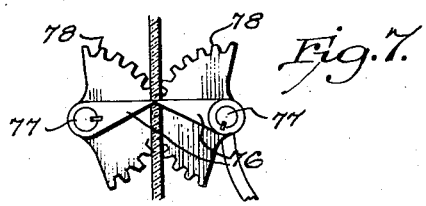

Figure 3 is a detail view of the upper edge of a sheet of glass showing the bait attached thereto, Figure 4 is a detail sectional view through the gate, taken on line 4—4 of Figure 1 but showing the gate in horizontal position to feed the drawn sheet of glass through the annealing chamber, Figure 5 is a horizontal sectional view through a portion of the annealing chamber taken on line 5—5 of Figure 1, Figure 6 is a vertical sectional view taken on line 6—6 of Figure 1, Figure 7 is a detail view of a cutting mechanism described and claimed in my prior Patent No. 1,479,206, granted January 1, 1924, Figure 8 is a horizontal sectional view on line 8—8 of Figure 6, Figure 9 is a detail view of the wire cutting mechanism.

Figure 10 is a vertical sectional view of one form of roll employed in connection with the downwardly fed glass, Figure 11 is a vertical sectional view substantially on line 11—11 of Figure 2, Figure 12 is a general view of the drive mechanism for the adjustable rollers, Figure 13 is a perspective view of the telescoping shaft employed in the driving mechanism, Figure 14 is a vertical sectional view on line 14—14 of Figure 1, and, Figure 15 is a front elevation of another type of roller.

Referring to the drawings, the reference numeral 1 designates the main tank or melting chamber of a furnace which is provided with suitable heating means (not shown) by means of which the glass is reduced to a fluid state. A refining chamber or working out chamber 2 communicates with the main tank and is separated therefrom by a gate 3 which may be provided with suitable adjusting means (not shown) to control the flow of glass into the working out chamber. Suitable heaters 4 are arranged in the working out chamber. These heaters may be of any desired type but in this instance. I have shown electric heaters employed for this purpose. The bottom of the chamber 2 is inclined toward the center, as at 5, and is provided with a movable section 6, by means of which an opening 7 may be provided for delivering the molten glass downwardly. As shown, the movable section 6 is provided with rollers 8 adapted to travel on a track 9 and is further provided with an operating lever 10 to facilitate movement on the track. The top of the working out chamber is provided with a slot 11 communicating with a housing or chamber 12 in which the elevating mechanism is arranged. The elevating mechanism consists of upper and lower shafts 13 arranged in pairs and provided with sprockets or rollers 14. Sprocket chains 15 are adapted to pass over the sprockets and between the chains, there is provided a conveyor formed of a plurality of closely arranged transverse slats 16 which may be formed of wood or other suitable material and provided with a covering of asbestos or the like. The shafts 13 are adapted to be adjusted toward each other a proper distance to contact with the sides of a sheet of glass fed upwardly through the slot 11. As shown, a bait 17 is adapted to be lowered into the glass and draw a sheet of glass 18 upwardly through the elevating mechanism, the upper edge of the sheet of glass adhering to the bait, as shown in Figure 3. As shown, the bait is provided with upwardly extending arms 19, having suitable flexible cables 20 connected thereto and these cables pass through openings in the top of the furnace and are trained over guide pulleys 21 mounted on a suitable shaft 22.

In the present invention, I provide means for annealing the sheet of glass in the furnace chamber from the heat radiated from the main tank or melting chamber. As shown, a gate 23 is adapted to be arranged on one side of the sheet of glass above the elevating mechanism and this gate is provided with wings 24 at each side which are hinged to the body. The wings are provided with suitable operating levers 25 which permit the wings to be closed on the sides of the glass after it has passed the elevating mechanism. The sheet of glass is cut above and below the gate and lowered to the position indicated by the reference numeral 26 in Figure 1 of the drawings. The furnace chamber is provided with a partition 27 forming a top for the melting tank through which a certain amount of heat will pass by radiation. Above this partition, I provide an annealing chamber 28 having a plurality of rolls 29 arranged therein. These rolls may be driven in any suitable manner as by means of a belt 30 passing over the rolls and over idlers 31 arranged between each pair of rolls. One of the end rolls may be provided with a shaft 32 projecting through the wall of the annealing chamber and having a sprocket 33 arranged thereon adapted to receive a chain (not shown) driven from any suitable source of power. As shown, the glass sheet 26 is adapted to travel over the rolls in the annealing chamber. Supplemental heaters 34 may be arranged in the annealing chamber to permit proper control of the temperature and permit the introduction of additional heat if insufficient heat is received by radiation.

Suitable means are provided for rolling glass fed downwardly from the refining chamber 2 through the slot 7. As shown, a pair of frames 35 are arranged beneath the slot and these frames are adjustable toward each other. Shafts 36 are mounted in the frames, a pair of shafts being arranged vertically in each frame to provide a pair of upper and lower rolls when the frames are assembled, A sheet of glass is adapted to pass downwardly, as indicated at 37 in Figure 11 of the drawings. Suitable rollers 38 are mounted on the shafts and are adapted to contact with the surface of the glass. The shafts and rollers are adapted to be driven from an electric motor 39 having a motor shaft 40. The motor shaft is provided with worms 41 adapted to mesh with gears 42 carried by the shafts 36. As shown (see Figures 12 and 13) the motor shaft is telescopic to permit it to be adjusted according to the distance between the frames. The outer worm 41 is carried by a section 43 which is provided with a reduced inner end 44. The main shaft 40 is provided with a longitudinal bore (not shown) adapted to receive the reduced end 44 of the auxiliary shaft 43. The reduced end of the shaft is provided with a key 45 adapted to be received in a groove (not shown) in the bore of the main shaft to prevent relative rotation of the two sections of the shaft.

Beneath the frames 35, I provide a portable or adjustable conveyor 46 having wheels or rollers 47 adapted to travel on a track 48. The conveyor frame is adapted to support a pair of spaced drive rollers 49 over which a conveyor 50 passes. The conveyor is preferably formed of a plurality of closely spaced transverse metal slats. An idler roll 51 is adapted to engage the conveyor slats to maintain the proper tension. The bearings of the rollers are mounted on a rod or arm 52 which extends beyond the frame of the conveyor at one end and is adapted to be adjusted toward the frames 35 by means of a lever 53 pivotally supported in a suitable bracket or standard 54. The interior of the conveyor may be filled with water for cooling, if desired.

Adjacent the conveyor, I provide a lower annealing chamber 55 having a plurality of rolls 56 arranged therein similar to the construction shown in the upper annealing chamber over which the rolled glass is adapted to pass. Auxiliary heating elements 57 may be arranged in this chamber.

Suitable means are provided for feeding wire to the glass to embed the wire in the glass. As shown, the frames 35 are provided with arms or extensions 58 adapted to support rolls 59 on which the wire cloth or mesh is arranged. The wire is fed from the rolls 59 over the idler rolls 60, as shown in Figures 1 and 11 of the drawings. The wire is then adapted to be delivered over the upper rolls 38 into the sheet of glass, as indicated at 61 in Figure 11 of the drawings. Suitable means are provided for cutting the wire in proper lengths depending upon the size of the sheets of glass being formed. As shown, a stationary cutter 62 is arranged beneath the wire and a movable cutter 63 is carried by a resilient arm 64. A cam 65 is arranged beneath this arm and connected to an upright arm or lever 66. These levers are connected to a horizontal member 67 having a lug 68 which is adapted to be tripped by a lug or projection 69 carried by one of the slats of the conveyor 50. By suitably spacing the lugs 69, the length of the wire cut may be regulated.

The conveyor 50 may be provided with suitable means for cutting the glass fed thereto from the rollers 38 into suitable lengths. As shown, the slats of the conveyor may be provided with recesses 70 adapted to receive beads 71 which will be forced into the glass and thus permit it to be separated into sheets.

The glass sheets drawn upwardly may also have the wire embedded therein, if desired. As shown, idler rolls 72 are arranged beneath the slot 7 and if desired, the wire may be passed upwardly through the slot and forced into the glass by the conveyor slats 16 of the elevating mechanism.

In Figure 10 of the drawings, I have shown one type of the roll which may be employed in place of the upper rolls 38 which is particularly adapted for embedding the wire into the glass. As shown, I provide a roll 73 having circumferential ribs 74 and these ribs force the wire into the glass. The glass then passes downwardly between the lower smooth rolls which smooth the outer surface of the plate or sheet.

In lieu of the roller shown in Figure 10 of the drawings, I may employ the roller shown in Figure 15 of the drawings, having a plurality of spiral ribs 75 which corrugate the glass and force the wire into the surface.

In Figure 7 of the drawings, I have shown a cutting mechanism that may be arranged beneath the slot 7 for the purpose of cutting the glass into sheets of the desired length. As shown, I provide a pair of cutters 76 mounted on suitable shafts 77 and these shafts are connected to each other by means of segmental gears 78 to operate in unison. An operating handle 79 may be secured to one of the shafts to permit manual actuation.

The operation of the device will be apparent from the foregoing description. The glass is heated to a fluid state in the main tank 1 and fed into the working out chamber or refining tank 2. The heaters 4 further heat the glass in the chamber 2 causing the impurities to rise to the surface and the glass to be worked is drawn from the depression caused by the inclined bottom 5. The glass is drawn upwardly by lowering the bait 17 into the pool of glass, causing the glass to adhere to the bait, forming a sheet 18, as shown in Figure 3 of the drawings. The bait is carried upwardly and when the sheet of glass passes between the slats 16 of the conveyor forming the elevating mechanism, the glass is further elevating by the elevating mechanism. The conveyors of the elevating mechanism may be driven from any suitable source and in Figure 1 of the drawings, I have shown a chain 80 from one of the rolls in the upper annealing chamber 28. The glass is carried above the elevating mechanism and the gate 23 secured thereto in the manner described. The portion of the glass beneath the gate and above the elevating mechanism is then cut, permitting the gate and the sheet of glass to assume the position indicated at 26 in Figure 1 of the drawings, whence the glass feeds through the annealing chamber 28 over the rolls 29. If wire glass is to be drawn, the wire is delivered from the rolls 59 over the idler roll 72 and upwardly through the slot 7.

The glass rolled from the bottom of the working out chamber is permitted to pass through the slot 7 which may be regulated by moving the movable section 6 of the bottom of the working out chamber on the track 9. The frames 35 are adjusted to properly position the rolls 38 and the rolls driven from the motor 39 by the gearing described. When wire is to be embedded in the glass, it is fed from the rolls 59 in the manner shown in Figure 11 of the drawings. Either the rib roll 73, shown in Figure 10 of the drawings or the roll provided with corrugations 75 shown in Figure 15 of the drawings may be employed on the upper shafts of the frame when wire is to be embedded. The lower rolls 38 are provided with smooth surfaces to smooth the faces of the glass. The glass is delivered to the conveyor 50 which may be adjusted laterally on the track 48 and which may be adjusted vertically through the lever 53 and thence conveyed to the annealing chamber 55. The conveyor 50 may be water cooled, as described. The studs 71 regulate the width of the glass which may be cut in any desired length by the cutters 76.

It will be apparent that I have provided an apparatus by means of which glass may be drawn upwardly and withdrawn downwardly for rolling at the same time and in which wire may be embedded in either of the formed sheets of glass withdrawn from the tank.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a main tank, a working out chamber communicating with said tank, means for withdrawing glass from said chamber to form sheets, and an annealing chamber formed adjacent said main tank and adapted to be heated by radiation therefrom.

2. In a device of the character described, a main tank, a working out chamber communicating therewith, means for discharging molten glass from the bottom of said working out chamber, rollers arranged beneath said working out chamber and adapted to roll said discharged glass to form sheets, and an annealing chamber arranged beneath said main tank and adapted to be heated by radiation therefrom.

3. In a device of the character described, a main tank, a working out chamber communicating therewith, means for drawing glass sheets upwardly from said working out chamber, means for discharging glass downwardly from said working out chamber, rollers arranged beneath said working out chamber and adapted to roll said discharged glass to form sheets, a wire reel arranged beneath said working out chamber, and means for delivering wire from said reel to the glass sheets formed above or below said working out chamber.

4. In a device of the character described, a main tank, a working out chamber, means for discharging glass from the bottom of said working out chamber, rollers arranged beneath said working out chamber and adapted to roll said discharged glass to form sheets, a conveyor arranged beneath said rollers, and beads carried by said conveyor adapted to longitudinally cut the glass sheets to a desired size.

5. In a device of the character described, a main tank, a working out chamber communicating therewith, means for discharging glass from the bottom of said working out chamber, rollers arranged beneath said working out chamber and adapted to roll the discharged glass into sheets, a wire reel mounted adjacent said rollers, cutting mechanism to cut the wire into desired lengths, a conveyor arranged beneath said rollers, and operating mechanism for said cutting mechanism actuated by said conveyor.

6. In a device of the character described, a main tank, a working out chamber communicating therewith, means for discharging glass from the bottom of said working out chamber, rollers arranged beneath said working out chamber and adapted to roll the discharged glass into sheets, a wire reel mounted adjacent said rollers, cutting mechanism to cut the wire into desired lengths, a conveyor arranged beneath said rollers, an operating arm connected to said cutting mechanism, a lug carried by said arm, and a lug carried by said conveyor and adapted to engage said first mentioned arm to actuate said cutting mechanism.

7. In a device of the character described, a main tank, a working out chamber, means for discharging glass from the bottom of said working out chamber to form sheets, cutting mechanism arranged to cut the sheets transversely, rollers arranged beneath said cutting mechanism, a conveyor arranged beneath said rollers, cutters carried by the conveyor and adapted to longitudinally cut the glass sheets to a desired size, and means for passing the glass sheets through an annealing chamber formed adjacent said main tank and heated by radiation therefrom.

8. In a device of the character described, a main tank, a working out chamber, means for discharging glass from the bottom of said working out chamber, mechanism arranged beneath said working out chamber for forming glass into sheets, a conveyor arranged beneath said forming mechanism, cutters carried by said conveyor and adapted to longitudinally cut the glass sheets to a desired size, an annealing chamber adjacent said main tank and heated by radiation therefrom, and means for passing the glass sheets through the chamber to anneal the glass.

9. In a device of the character described, a main tank, a working out chamber, means for discharging glass from the bottom of said working out chamber, mechanism arranged beneath said working out chamber for forming glass into sheets, a laterally movable and vertically adjustable conveyor arranged beneath said forming mechanism, cutters carried by said conveyor and adapted to longitudinally cut the glass sheets to a desired size, an annealing chamber adjacent said main tank and heated by radiation therefrom, and means for passing the glass sheets through the chamber to anneal the glass.

10. In a device of the character described, a main tank, a working out chamber communicating therewith, means for drawing glass sheets upwardly from said working out chamber, means for discharging glass downwardly from said working out chamber, a wire reel, and means for delivering wire from said reel to the glass sheets formed above or below said working out chamber, and corrugated faced rolls adapted for embedding the wire into the glass sheets.

In testimony whereof, I affix my signature.

GEORGE A. SHIELDS.